OUTLINE OF BULK MATERIAL 10
FROM WHICH CABOCHON 20 IS CUT

United States Patent Office 3,778,361
Patented Dec. 11, 1973

3,778,361
PROCESS FOR RENDERING TRANSPARENT MEDIA ARTIFICIALLY OPALESCENT AND RESULTING PRODUCT
Jeofry Stuart Courtney-Pratt, Locust, N.J., assignor to Bell Telephone Laboratories, Incorporated, Murray Hill and Berkeley Heights, N.J.
Filed Sept. 1, 1972, Ser. No. 285,823
Int. Cl. B01j 1/10
U.S. Cl. 204—157.1 R    11 Claims

ABSTRACT OF THE DISCLOSURE

An opalescent effect is created artificially in suitable bulk material by the interference of two beams directed into the material at the Bragg angle. Optical energy is thus concentrated along desired planes and a planar alteration of refractive index along these planes is achieved. Suitable bulk materials include polymethyl methacrylate. A general class of suitable materials is characterized. Production techniques are set forth.

FIELD OF THE INVENTION

This invention relates in general to artificial gems and specifically to a process through which the condition of opalescence is achieved artificially in suitable materials by interferometric means.

BACKGROUND OF THE INVENTION

The centuries long fascination of men for gem stones has in recent years turned toward searches for artificially reproducing the elusive material structures that will release the striking spectral displays.

One especially intriguing gem stone is the opal whose structure for years has been known to be $SiO_2 \cdot n \cdot H_2O$, a hydrated amorphous silica softer and less dense than quartz. An opal of gem quality will have definite and marked irridescent plays of color.

Until recently, however, the causes and origins of the color of opals were not well understood. Work at the Commonwealth Scientific and Industrial Research Organization (CSIRO) in Victoria, Australia, has shown, through electron microscope techniques, that the color plays in opals are due to diffraction of incident light from small particles of amorphous silica, which are remarkably regular in both size and spacing throughout any given patch that exhibits uniform color. The equations covering the wavelengths and angles of diffraction for such a structure are very similar to those that define Bragg reflections of X-rays in crystals, except that for the opals the wavelengths are in the visible region and the spacings are not those of atoms in a crystal but of the center-to-center distances of the small silica particles.

These silica particles sometimes stack in cubic arrays and sometimes in hexagonal patterns. Sometimes the pattern alternates from one group of layers to another in a regular fashion. This understanding has led to methods of preparing opaline materials by production of silica particles from silica gel, and by selecting particles of suitable size by slow elutriation. An example of the preceding is found in the teaching of Gaskin et al. Pat. 3,497,367 assigned to CSIRO. Here, silica particles within the size range of 150 through 450 millimicrons are prepared in a suspension with an ordered close spacing which is then stabilized by drying, heating, or bonding.

Elsewhere in the precious gem art, irradiation techniques have been used, for example, to induce rearrangement of the diamond's crystal structure to render it more light absorbent toward the red end of the visible spectrum. The irradiations used have included electrons or slow neutrons, gamma rays, photons, alpha particles, and others.

It has therefore been evident for some time that opaline qualities might be synthetically achieved by reproducing, in some suitable medium, the alternation of refractive index that occurs in natural opals; and that a logical alternative choice of process was by irradiation. To applicant's knowledge, however, no such process has yet been proposed.

Accordingly, the following are all objects of the invention:

To produce the quality of opalescence in a transparent and naturally nonopalescent material;

To define a class of materials in which the state of artificial opalescence may be produced;

To find specific such materials and gem structures that make good use of the artificially caused opalescence; and To state a broad process by which in such materials the desired artificial opalescence is achieved.

SUMMARY OF THE INVENTION

The invention broadly contemplates achieving a planar alteration of refractive index in a suitable crystalline or otherwise transparent medium, by the agency of applied optical energy from a multiplicity of sources capable in combination of concentrating the optical energy density along the desired planes. The planes thus created are spaced pursuant to a further aspect of the invention a predetermined constant amount to achieve a desired wavelength of reflected light.

The planes are in general parallel; but for certain effects, adjacent reflecting planes may be established at a small acute angle with respect to one another.

In a specific embodiment of the invention, an array of reflecting planes are created in bulk polymethyl methacrylate, by intersecting two beams from a helium cadmium laser directed into the material at the Bragg angle from opposite sides of a plane normal to a flat face.

The invention and its further objects, features and advantages will be fully apprehended from a reading of the detailed description to follow of illustrative embodiments.

DETAILED DESCRIPTION OF ILLUSTRATIVE EMBODIMENTS

Figure 1:
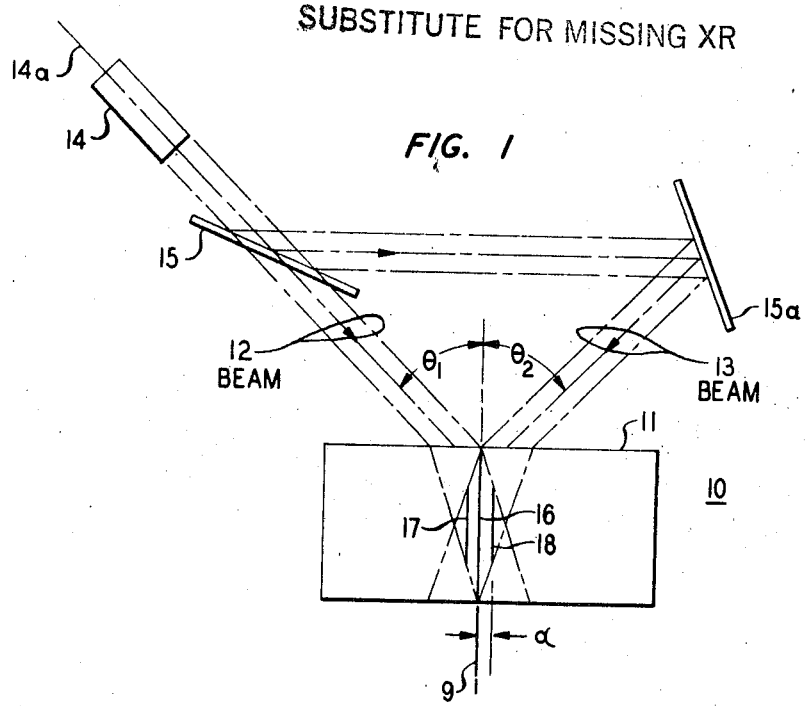
FIG. 1 is a schematic side view of bulk material being irradiated pursuant to the invention.

FIG. 1 illustrates a simple embodiment of the inventive process involving a transparent bulk solid medium 10 with at least one flattened exterior surface 11 onto which two optical beams 12, 13, impinge. The beams 12, 13 pursuant to a principal aspect of the invention are highly monochromatic, i.e., characterized by a specific wavelength. The beams 12, 13 are also phase-coherent, and so must be derived from a single source. The foregoing optical source can be, of course, a laser shown as element 14. The beams 12, 13 are derived from the output of laser 14 by use of semitransmitting, semireflecting mirror 15 and a reflecting mirror 15a.

The wavelength of light emitted by the laser 14 is designated $\lambda_l$. The angles which the beams 12, 13 make with respect to a plane normal to the surface 11, and designated $\theta_1$, $\theta_2$ are critical in the practice of the invention and will be described shortly.

The surface 11 is required to be somewhat optically flat to a few wavelengths of light, in order to achieve uniform color effects. The bulk medium 10 must be transparent to permit travel of the optical energy as well, of course, as to permit reflected light to emanate from within the bulk.

The material 10 is further characterized by what may be termed highly local susceptibility to intense internally and locally acting optical energy. The internal localization of the optical energy intensity is achieved by interferrometric principles explained by reference to FIG. 1. The beams 12, 13 are columns of light at the incident wavelength designated $\lambda_1$, and for convenience the two incident angles $\theta_1$, $\theta_2$ may be made equal and denoted $\theta$. On entering the surface 11 at incident angle $\theta$, each beam 12, 13 undergoes a refraction. Within the bulk 10, the beams 12, 13 encounter each other; and because of their original in-phase relationship, having been derived from a single laser source, the beams will interfere. The regions where the additive effects of the interfering beams 12, 13 are greatest, are the planes designated 16, 17, 18, plane 16 being the plane with respect to which the incident angles are measured and also being normal to the surface 11 of $\theta_1$ equals $\theta_2$.

The number of planes such as 16, 17, 18 that can be produced in the bulk 10 with a single application of energy from laser 14, and not involving movement of the bulk 10 or of laser 14, will depend on their spacing and the internal extent, of the overlap of the beams 12, 13 with the bulk 10; but generally the number of planes will be five to ten thousand for color regions 1 to 2 mm. across. Importantly, the distance designated $\alpha$, in FIG. 1 will determine the wavelength $\lambda_0$ of the enhanced reflection viewed normal to the planes. This fact arises from the following familiar Bragg reflection considerations:

$$\lambda_1 = 2\alpha \sin \theta \qquad (1)$$

Hence, $$\alpha = \frac{\lambda_1}{2 \sin \theta} \qquad (2)$$

also:

$$\lambda_0 = 2n\alpha \qquad (3)$$

where $n$=the index of refraction of bulk material 10.

From the foregoing it follows that the desired reflected light wavelength as seen from a position normal to the planes will be determined by the distance between the planes 16, 17, 18; and this in turn will be determined by the combination of the wavelength $\lambda_1$ of the incident light and the incident angle $\theta$ ($\theta_1 = \theta_2 = \theta$).

Typically we will use an ultraviolet irradiating wavelength $\lambda_1$ of for example 3250 A. If it is desired to have a red reflection of, for example, $\lambda_0 = 6500$ A., then from Equation 3: $\alpha = 6500$ A.$\div 2n$; and combining equations: $\sin \theta = \lambda_1 \div 2\alpha = n \times \lambda_1 \div \lambda_0 = n/2 \doteq 0.75$. Hence, the angle of incidence $\theta \doteq 48$ degrees. Such an array of refracting planes will give a red opal-like reflection when viewed from a direction normal to the planes, and will similarly give opal-like reflections at oblique incidence where the incident and reflected beams satisfy the usual Bragg reflection criteria.

Figure 2:
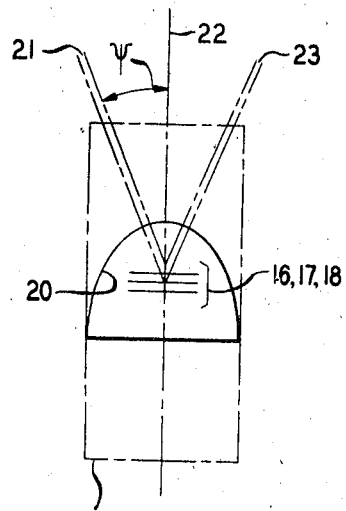
FIG. 2 is a schematic side view of a cabochon cut from irradiated bulk material.

Pursuant to a specific embodiment of the invention, it is advantageous to enclose the set of planes 16–18 by cutting a hemispherical surface or cabochon designated 20 out of the bulk material 10. As illustrated in FIG. 2, a beam of incident light 21 upon the planes such as 16–18 produced pursuant to the foregoing process, and impinging at an angle denoted $\psi$ with respect to the normal designated 22 will result in reflection of a color whose characteristic wavelength $\lambda_1$ is determined by: $\lambda_1 = \lambda_0 \cos \psi$. As the incident angle $\psi$ varies from 0 to approximately 50 degrees, the reflected wavelength $\lambda_1$ will shift from red through green to purple.

The bulk material used in the foregoing described experiment was polymethyl methacrylate (PMMA) which when freshly prepared can be influenced by irradiation with ultraviolet light to affect the degree of cross-linking and hence the refractive index.

Other materials which permit localized refractive index changes through the action of locally applied optical energy are readily found. Pursuant to a further embodiment of the invention, theh bulk material 10 can, for example, be a crystal of lithiom niobate whose internal crystalline structure can be changed or damaged by irradiation pursuant to the described process.

It is possible to multiply expose UMMA or the bulk material such as the lithium niobate crystal thus to achieve a multicolored synthetic specimen. Two (or more) sets of intersecting planes of varying refractive index can each yield enhanced Bragg reflections substantially independent of one another.

The exposure sufficient to induce the requisite refractive index changes in lithium niobate is in the range of 1 to 100 joules per square centimeter of cross section. Hence, exposure time for a small, i.e., 1 cm. x 1 cm. x 1 cm. region within a crystal is in the range of 1 to 100 seconds, using in this case an argon laser. The exposure for a 2 mm. x 2 mm. x 2 mm. region within PMMA is typically 2½ minutes with a total laser power of 1½ milliwatts.

Implementation of the inventive process on a production scale is preferably a step and repeat operation in which a strip sheet or sample of the bulk material is passed beneath one or more stationary pairs of interfering beams. In general if the overlap of the pair of interfering beams is, for example, a circle 5 mm. in diameter, then a single region substantially 5 mm. in diameter is produced for each exposure. Such a region would be opalescent, but only in directions in a single plane.

Figure 3:
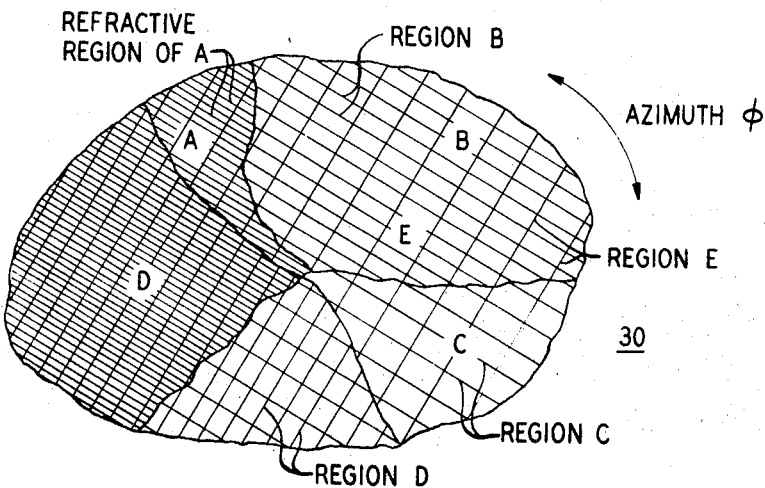
FIG. 3 is a plan view of a section of flat surface of said bulk, in which regions of reflecting planar arrays produced by irradiation as shown.

To achieve an opalescence more nearly having the appearance of an ordinary opal, an exposure pattern producing refractive planes such as are depicted in FIG. 3, is desirable. There, numeral 30 designates in plan view a planar surface region of a bulk material, in which multiple exposures have been produced. Specifically, a first exposure is made through a mask of a subregion of arbitrary shape, designated A, with an incident angle $\theta_1$. Then, a second exposure is made in the region B at an incident angle $\theta_2$; and a third exposure in region C at an incident angle $\theta_3$. The regions A, B, and C are shown as non-overlapping, and as having all refractive planes mutually parallel. At this point, rotation of the bulk material in azimuth (and/or in any other direction) is effected; and further sets of planes are produced at an angle to the first three sets, for example in the regions denoted D and E, incident angle $\theta$ again differing. Thus, in this specific example, the region D overlaps portions of the regions A and C; and the region E overlaps all of the region B plus portions of the regions A and C. Obviously, the overlap can be varied at will.

Figure 4:
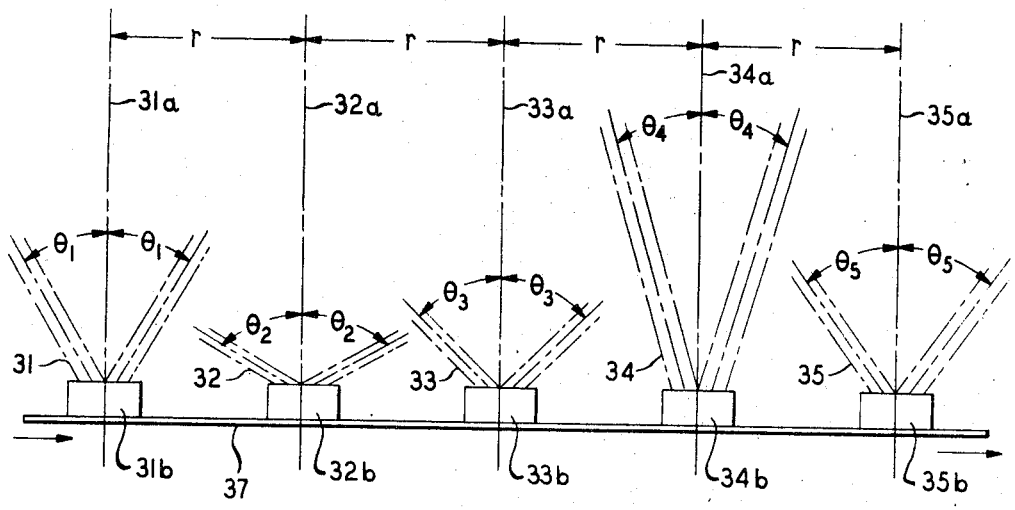
FIG. 4 is a side schematic view of a production sequence practicing the invention.

FIG. 4 depicts a multiplicity of pairs of interfering beams, the source of each pair being from a single laser using many beam splitters (non shown). The beam pairs, designated 31–35, are stationed on a series of axes 31a–35a which are normal to a moving surface such as conveyor belt 37 on which samples such as 31b–35b are advanced. The spacing between adjacent ones of the normals 31a–35a and denoted $r$ is advantageously uniform. Likewise, the spacing of the samples 31b–35b along the advancing belt 37 is the same as that between the normals 31a–35a.

The multiple exposure pattern described above with respect to FIG. 3 can readily be produced with the apparatus of FIG. 4. Thus, the interfering beam pair 31 occurs at the incident angle $\theta_1$ with respect to normal 31a; and so on for the interfering beam pairs 32–35, each beam pair being oriented at a different incident angle with respect to the normal. Of course, either overlap or non-overlap regions of multiple exposure can be achieved depending on the desired effect. The samples must, of course, be stationary during exposure and hence the conveyor belt 37 must be supplied with an appropriate stepping mechanism (not shown) to achieve this end. Thus, with a number of exposing stations, a number of different exposures can be perfected to produce a like number of differently colored patches within the bulk material. Each patch will change color as lighting or the angle of the opal is changed.

The spirit of the invention is embraced in the claims to follow.

What is claimed is:

1. Process for producing artificial opalescence, comprising:
   irradiating a material specimen with a pair of beams derived from a single source of coherent radiation having a preselected characteristic wavelength;
   said specimen being optically transparent and characterized by localized internal susceptibility to refractive index change by locally acting optical energy, said specimen having at least one external optically flat surface;
   each of said beams being directed onto said flat surface at incident angles, with respect to a plane normal to said surface, that are selected to allow said beams to interferometrically combine within said specimen thereby concentrating the optical energy in a succession of parallel planes therewithin;
   the distance between adjacent ones of said parallel planes being determined by said preselected wavelength and by said incident angles; and
   continuing said irradiation for an exposure time sufficient to effect a desired change in refractive index localized along said planes.

2. The process pursuant to claim 1, wherein said incident angles are substantially equal.

3. The process pursuant to claim 2, wherein said specimen material is polymethyl methacrylate and wherein said equal incident angles vary from substantially zero to substantially 50 degrees, thereby to cause the wavelength of reflected light from said planes to fall at a point in a range of perceived colors from red to purple.

4. The process pursuant to claim 1, wherein said specimen material is polymethyl methacrylate and wherein said incident wavelength is substantially 3250 A., thereby to produce a reflected wavelength in the red region when an incident illuminating beam and the corresponding reflected beam satisfy Bragg reflection criteria.

5. The method pursuant to claim 1, wherein said specimen material is lithium niobate crystal.

6. Product made pursuant to the process of claim 1.

7. The method for creating in a bulk material an opalescent character comprising the steps of:
   selecting a bulk material that is optically transparent and capable of undergoing internal alteration of refractive index along closely spaced parallel planes in response to applied optical energy localized at said planes, without optical change occurring in the intervening region;
   creating at least one substantially optically flat surface on said bulk;
   at a first station, directing from a single source of coherent radiation of a preselected wavelength first and second beams into a first selected subregion of the flat portion of said bulk material, both said beams entering said subregion at the same preselected angle with respect to a plane normal to said flat portion;
   at a second station, directing a second pair of beams from a like radiation source into a second selected subregion of said flat portion at a second incident angle with respect to a normal plane;
   and at further successive stations directing a pair of beams into further preselected subregions of said surface at incident angles with respect to a plane normal to said surface in each case that are preselected;
   said beams at each station being energized, while said bulk material is stationary, for a predetermined time sufficient to create at each said station a separate array of reflecting planes within said bulk.

8. The method pursuant to claim 7, wherein said subregions do not overlap.

9. The method pursuant to claim 7, wherein at least two of the said subregions do overlap.

10. The method pursuant to claim 7, wherein at least one said set of planes is created by directing at least one of the said pairs of interfering beams into said bulk through a second preselected optically flat surface.

11. The method for internally altering a crystalline medium to render the medium opalescent, comprising the step of subjecting the medium to plural laser beams each having a preselected characteristics wavelength and arranged to interferometrically combine at preselected regions within the crystal and cause spaced refractive index changes.

References Cited
UNITED STATES PATENTS

| | | | |
|---|---|---|---|
| 3,405,045 | 10/1968 | Hoskins | 204—158 R |
| 3,075,906 | 1/1963 | Chow | 204—157.1 H |

HOWARD S. WILLIAMS, Primary Examiner

U.S. Cl. X.R.

204—158 R, 159.14, Dig. 11; 250—454; 423—593